(12) United States Patent
Schierbaum (10) Patent No.: US 6,457,305 B1
(45) Date of Patent: Oct. 1, 2002

(54) TURBO SHAFT ENGINE WITH ACOUSTICAL COMPRESSION FLOW AMPLIFYING RAMJET

(76) Inventor: James R. Schierbaum, 25 Salwey Ct., Newnan, GA (US) 30265

( * ) Notice: Subject to any disclaimer, the term of this patent is extended or adjusted under 35 U.S.C. 154(b) by 31 days.

(21) Appl. No.: 09/778,340

(22) Filed: Feb. 7, 2001

(51) Int. Cl.[7] .............................................. F02C 3/05
(52) U.S. Cl. ..................................... 60/39.43; 60/269
(58) Field of Search ............................ 60/39.43, 39.52, 60/269, 726

(56) References Cited

U.S. PATENT DOCUMENTS

| | | | |
|---|---|---|---|
| 1,289,960 A | * | 12/1918 | Taylor ........................ 60/39.43 |
| 1,362,997 A | * | 12/1920 | Koleroff ....................... 60/269 |
| 1,375,601 A | * | 4/1921 | Morize ......................... 60/269 |
| 2,537,344 A | * | 1/1951 | Gruss .......................... 60/39.43 |
| 3,048,014 A | * | 8/1962 | Schmidt ....................... 60/269 |
| 3,156,093 A | * | 11/1964 | Chapman ..................... 60/39.43 |
| 3,635,029 A | | 1/1972 | Menioux |
| 3,685,287 A | * | 8/1972 | Dooley ........................ 60/39.43 |
| 4,535,592 A | | 8/1985 | Zinsmeyer |
| 4,548,034 A | | 10/1985 | Maguire |
| 4,684,321 A | | 8/1987 | Barrett et al. |
| 5,347,807 A | | 9/1994 | Brossier et al. |
| 5,417,057 A | * | 5/1995 | Robey ......................... 60/269 |
| 5,450,719 A | | 9/1995 | Marsh |
| 5,709,076 A | | 1/1998 | Lawlor |
| 5,775,105 A | | 7/1998 | Zinsmeyer |
| 5,946,904 A | * | 9/1999 | Boehnlein et al. ............ 60/269 |

* cited by examiner

Primary Examiner—Michael Koczo
(74) Attorney, Agent, or Firm—Dale J. Ream (57) ABSTRACT

A ramjet for amplifying an air stream flow rate includes a plurality of blades positioned within a turbine housing for rotation by an intake flow received through a housing inlet port. A gas generator having a primary air duct defines intake and outlet ports, the intake port receiving the intake flow from the housing. A combustion chamber is connected to the primary air duct for igniting an admixture of fuel and a portion of the intake flow to form an energized motive flow. The motive flow is discharged from the combustion chamber back into the air intake of the primary air duct so as to amplify the flow rate of incoming intake flow by momentum transfer. A portion of the motive flow is returned directly to the housing inlet port for amplifying incoming intake flow. The remaining motive flow is again combusted and used to rotate the turbine blades.

21 Claims, 7 Drawing Sheets

TURBO SHAFT ENGINE WITH ACOUSTICAL COMPRESSION FLOW AMPLIFYING RAMJET

BACKGROUND OF THE INVENTION

This invention relates generally to turbine engines and, more particularly, to a turbo shaft engine using an acoustical compression flow amplifying ramjet to move a large volume of air across turbine blades with a small volume of high energy air.

Conventional gas turbine engines operate to compress incoming air to increase its pressure before it is ignited in a combustion chamber. High energy exhaust gases exit the combustion chamber to drive a turbine and are then exhausted from the engine. Existing systems, however, suffer from a myriad of design complexities and limitations such as thermal inefficiency, fuel consumption, and performance and material limitations due to intense heat production during operation.

Therefore, it is desirable to have a turbo shaft engine which utilizes a small amount of highly energized air to move a large amount of incoming air across turbine blades. This limited burn decreases typical thermal inefficiencies and limitations. Further, it is desirable to have a turbo shaft engine that extracts energy from both incoming air and energized motive flows. It is also desirable to have turbo shaft engine that utilizes a ramjet which uses acoustical pulses for sequentially staging multiple flow rate amplifications.

SUMMARY OF THE INVENTION

An improved turbo shaft engine according to the present invention includes a turbine housing defining an inlet opening for receiving an intake flow into an interior chamber. A turbine assembly having a plurality of blades is rotatably mounted in the chamber for rotation by the intake flow. The turbine housing is coupled to a ramjet gas generator having a tubular primary air duct. The air duct defines opposed intake and outlet ports, the intake port receiving the intake flow from the chamber. The gas generator includes a primary inlet passage configured to receive a portion of the intake flow from the primary air duct, the flow direction of the intake flow portion being reversed by an arcuate wall. This flow reversal amplifies the flow rate of the intake flow portion. The gas generator includes a primary combustion chamber positioned to receive the intake flow portion and, upon injection of fuel, to ignite the intake flow portion to form a highly energized motive flow. A portion of the motive flow passes as a backflash into a resonance chamber and causes acoustical waves that pulsatingly draw more intake flow into the combustion chamber, compress it prior to combustion, and expel motive flow back into the air intake port following combustion. Exhausting the high velocity motive flow back into the primary air duct results in a momentum transfer through direct impact with the slower moving intake flow. Thus, a large volume of air is moved toward the outlet port using a small volume of high energy air (motive flow). This sequential amplification of intake air is performed efficiently due to the acoustical pulse within the resonance chamber. Flow amplification increases mass air flow and primary fuel combustion efficiency.

A motive flow and a majority of the intake flow are diffused into a secondary combustion chamber for a limited burn combustion. This combustion is accomplished efficiently and with a limited amount of fuel in that the secondary combustion chamber is configured to induce a torroidal vortex during combustion. A majority of the amplified motive flow is passed through an exhaust adapter coupled to the turbine blower housing for rotation of the turbine blades. As the amplified motive flow passes over the blades, it is centrifugally discharged into the atmosphere through an outlet opening.

Therefore, a general object of this invention is to provide an improved turbo shaft engine which moves a large amount of air using a small amount of high energy air.

Another object of this invention is to provide a turbo shaft engine, as aforesaid, which amplifies an air intake flow through momentum transfer provided by a motive flow reintroduced into a primary air duct following combustion.

Still another object of this invention is to provide a turbo shaft engine, as aforesaid, which extracts energy from the velocity of incoming air for improving low RPM torque output.

Yet another object of this invention is to provide a turbo shaft engine, as aforesaid, which reduces thermal inefficiency by utilizing limited combustion and self-cooling with incoming air.

A further object of this invention is to provide a turbo shaft engine, as aforesaid, which lowers nitrous oxide and other pollutant emissions.

A still further object of this invention is to provide a turbo shaft engine, as aforesaid, which utilizes an acoustical pulse for pumping and compressing an intake air flow into a primary combustion chamber.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

Figure 1:
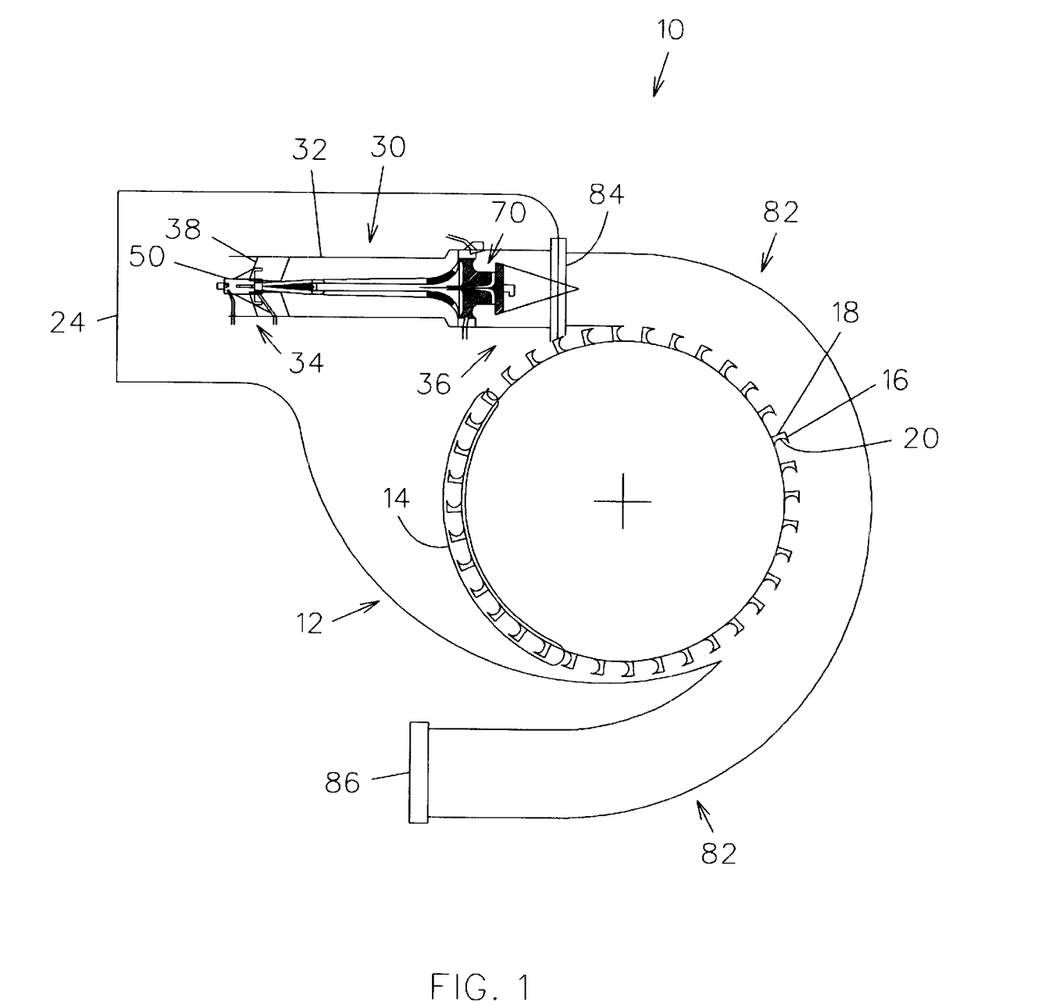
FIG. 1 is a cross-sectional view of a turbo shaft engine according to a preferred embodiment of the present invention.

A turbo shaft engine with an acoustical compression flow amplifying ramjet according to the present invention will now be described with reference to FIGS. 1–7 of the accompanying drawings. A preferred embodiment of the turbo shaft engine 10 includes a blower housing 12 defining an interior chamber and an arc-shaped blower inlet port 14 for receiving an air flow into the chamber (FIG. 1), although inlet ports having other configurations would also be suitable. The blower housing 12 may define blower inlet ports 14 on opposed sides thereof to maximize collection of an air flow from the atmosphere. A turbine fan assembly is rotatably mounted in the chamber and includes a plurality of blades 16 radially extending from a hub in a conventional manner. Each blade 16 includes a front face 18 having a flat surface for direct impact with the air flow flowing into the chamber through a respective blower inlet port 14 (FIG. 1). Each blade 16 further includes a rear face 20 having a concave configuration such that a vortex is induced as air passes across each blade. This blade configuration maximizes the pressure differential across each blade as an air flow passes thereacross. It is understood that the blower inlet ports 14 and turbine blades 16 are positioned such that an incoming air flow directly impacts the front faces 18 of the blades 16. Therefore, maximum torque production may be harvested from the incoming air flow.

Figure 7:
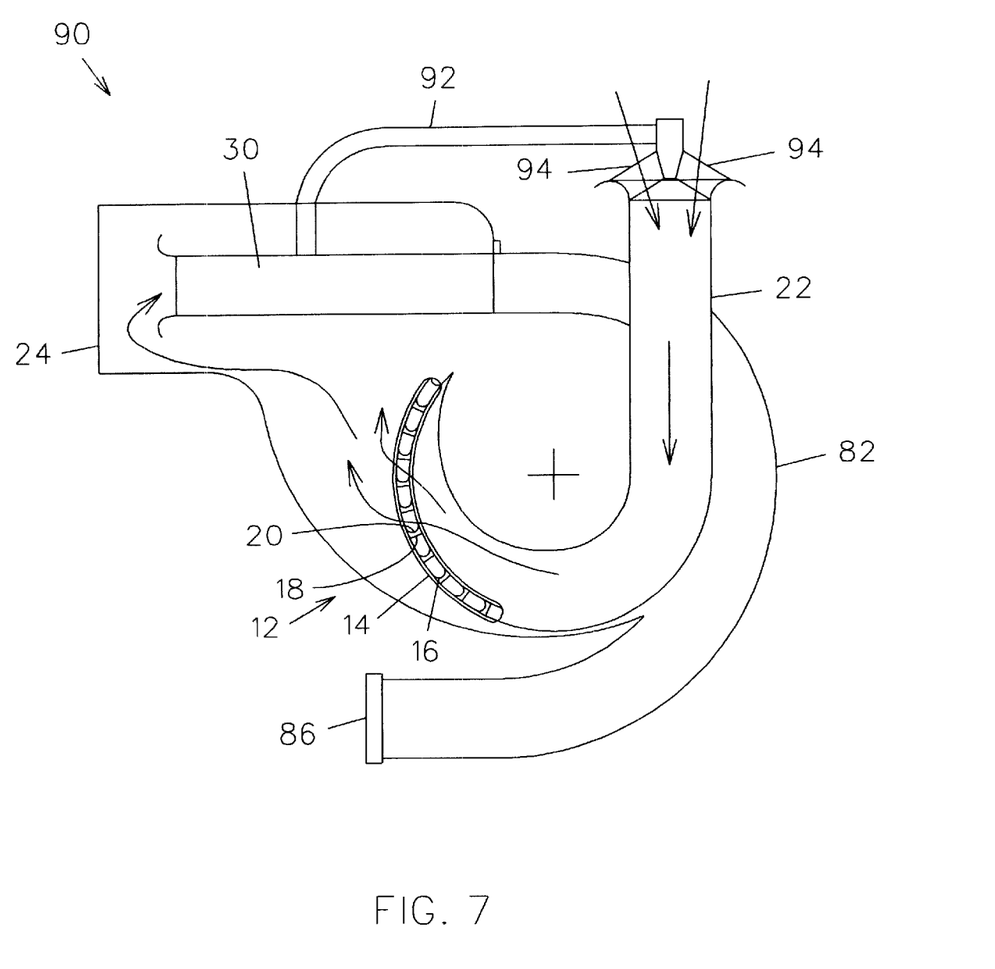
FIG. 7 is a side view of the turbo shaft engine according to another embodiment of the invention.

A tubular air intake channel 22 is associated with each blower inlet port 14 and is fixedly attached to the exterior of the blower housing 12 (FIG. 7). Each channel 22 includes a first end defining an intake opening 94 for receiving an air flow from the atmosphere. Each channel 22 also includes a second end defining an aperture in communication with a respective blower inlet port 14 for transferring the air flow into the housing chamber. Each channel 22 includes a straight tubular configuration toward the first end and gradually curves with a decreasing cross-sectional area toward the second end so as to increase the air flow's velocity as it enters the chamber.

A blower plenum 24 is integrally attached to the blower housing 12 and receives the incoming air flow after it passes across the blades 16. A ramjet gas generator 30 is mounted within the blower plenum 24 and comprises a tubular primary air duct 32 having upstream 34 and downstream 36 ends (FIG. 1). The upstream end 34 of the primary air duct 32 defines an air intake 38 through which the air flow flows into the primary air duct 32 (FIG. 2), this air flow hereafter referred to as the intake flow. The downstream end 36 of the primary air duct 32 defines an outlet port 40.

Figure 2:
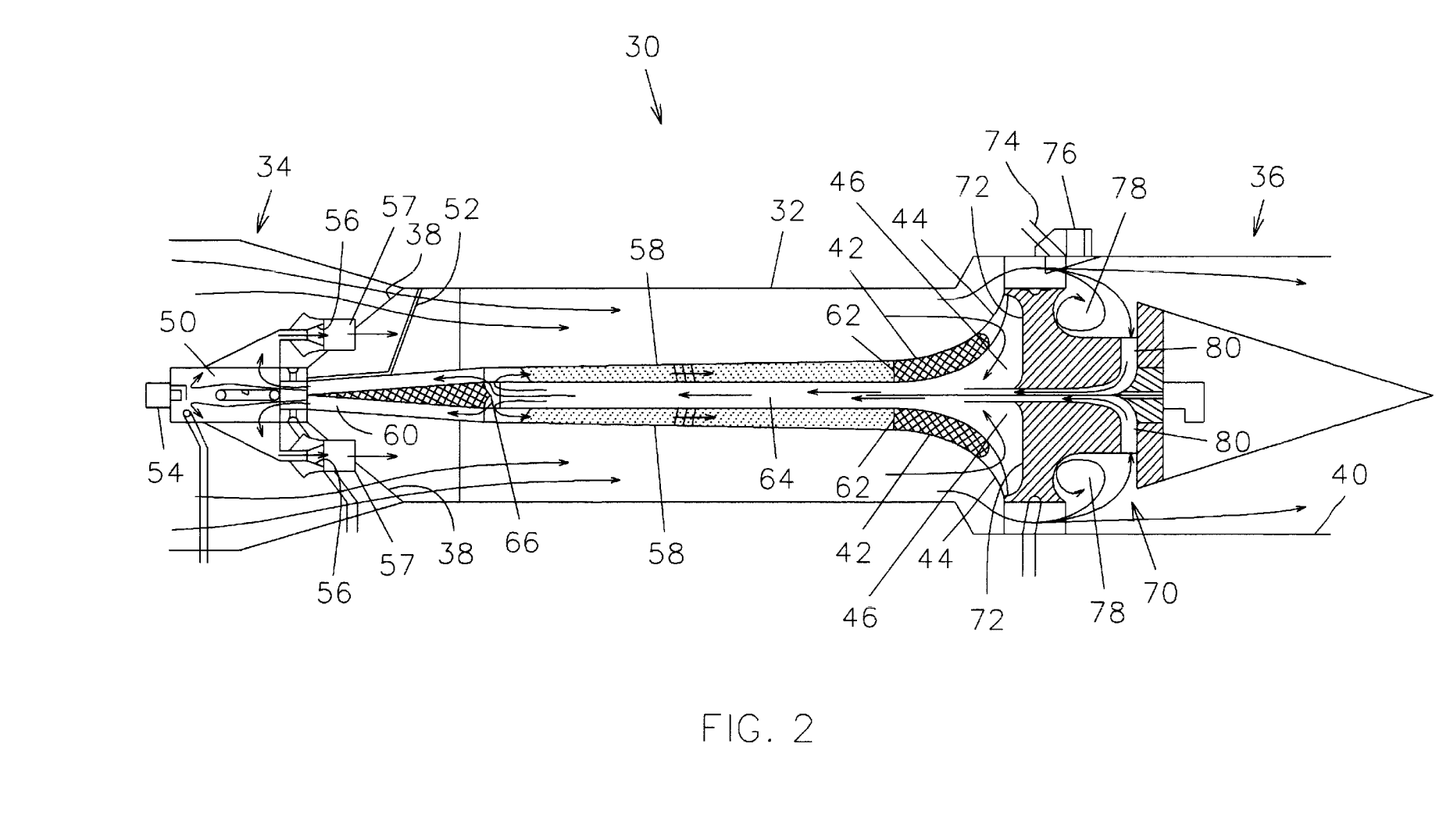
FIG. 2 is a cross-sectional view on an enlarged scale of the gas generator as in FIG. 1.
Figure 3:
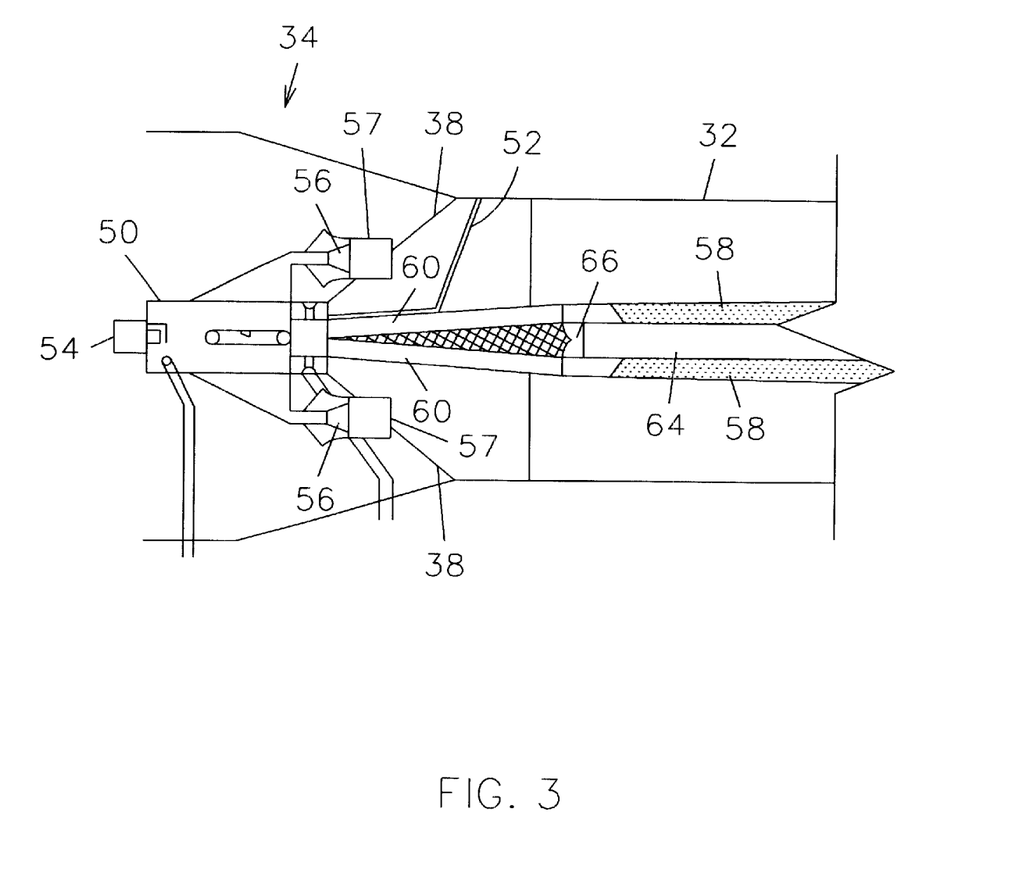
FIG. 3 is a fragmentary view on an enlarged scale of an upstream portion of the gas generator as in FIG. 2.
Figure 4:
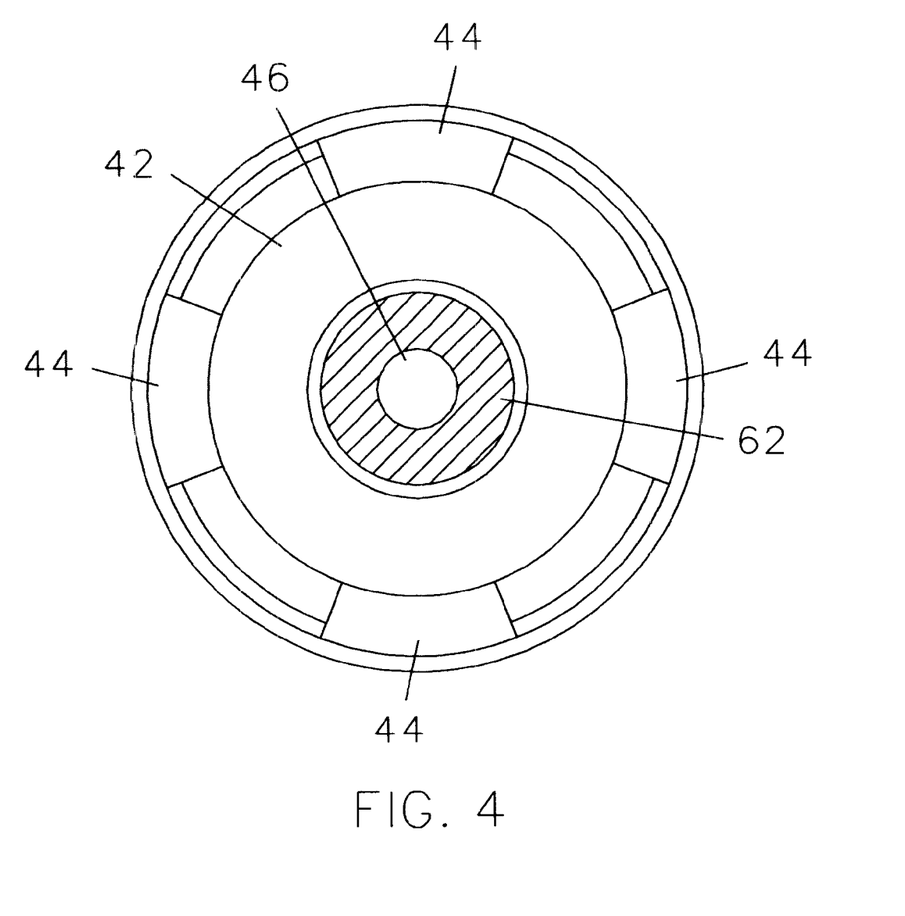
FIG. 4 is an upstream end view of the gas generator as in FIG. 2.
Figure 5:
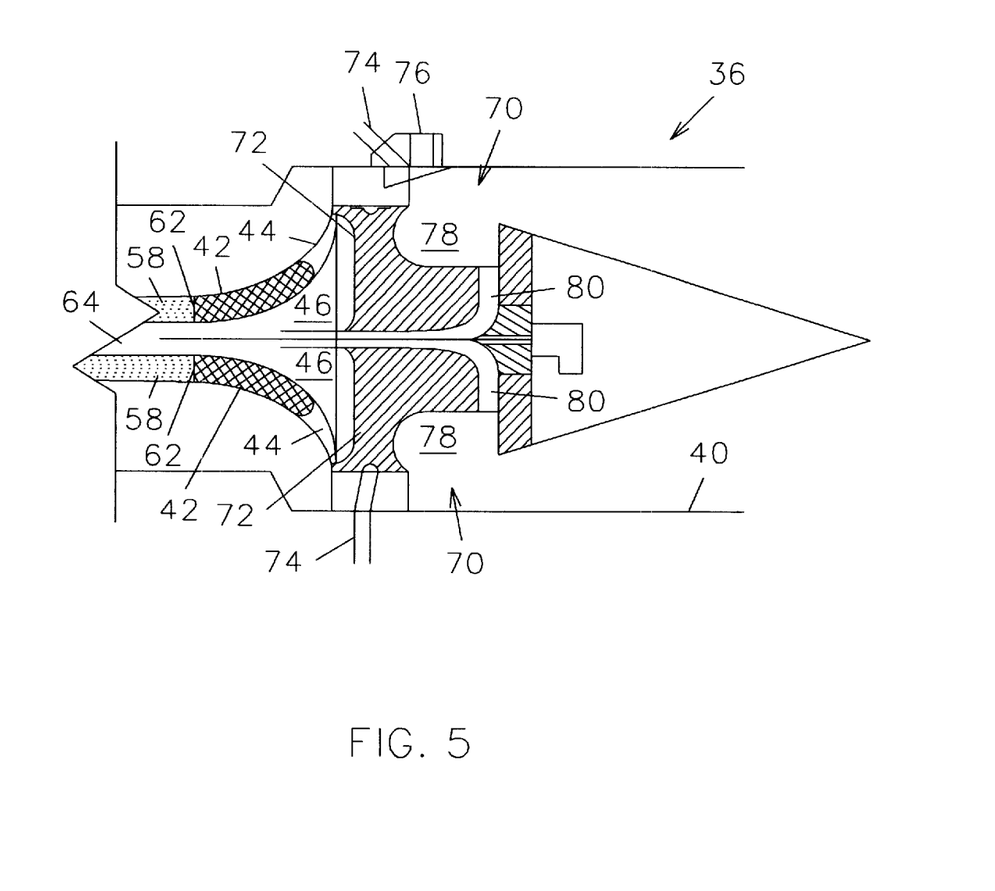
FIG. 5 is a fragmentary view on an enlarged scale of a downstream portion of the gas generator as in FIG. 2.

The gas generator 30 includes a diffuser cone 42 mounted concentrically within a downstream portion of the primary air duct, said diffuser cone being spaced upstream from the outlet port 40 (FIGS. 2 and 5). The diameter of the diffuser cone 42 increases between its upstream and downstream ends so as to diffuse the intake flow outwardly and toward the outlet port 40 as the intake flow passes thereacross. The diffuser cone 42 defines a plurality of primary inlet ports 44 for receiving a portion of the intake flow as it flows downstream (FIGS. 4 and 5). A secondary combustion chamber 70 includes an arcuate wall 72 coupled to and spanning the downstream end of the diffuser cone 42. The arcuate wall 72 operates to reverse the flow direction of the intake flow portion flowing through the primary inlet ports 44. The intake flow portion, once redirected, is received in a primary inlet plenum 46.

A primary combustion chamber 50 is mounted within the upstream end 34 of the primary air duct 32 adjacent to the air intake 38 (FIG. 2). The primary combustion chamber 50 includes a fuel inlet 52 and ignition assembly 54 for operation in a conventional manner. A tubular resonance chamber 58 is concentrically positioned within the primary air duct 32 and includes a first open end 60 in communication with the primary combustion chamber 50 and a second closed end 62 bearing against the upstream end of the diffuser cone 42 (FIG. 2). A primary inlet passage 64 is mounted within the primary air duct 32 and is configured to receive the intake flow portion from the primary inlet plenum 46. The primary inlet passage 64 is concentrically enveloped by the resonance chamber 58, the passage and chamber defining an annular discharge gap 66 at the upstream end of the primary inlet passage 64 through which the intake flow portion may pass into the resonance chamber 58 for transmittal into the primary combustion chamber 50, as to be described in more detail below. The discharge gap 66 is also referred to as a transfer port. Therefore, a small portion of the intake flow is captured by the diffuser cone, directionally reversed, and transferred,to the primary combustion chamber 50 for ignition.

A plurality of ejector nozzles 56 are coupled to the primary combustion chamber 50 with their respective outlets extending into the air intake 38 of the primary air duct 32. Upon ignition of an admixture of fuel and an intake flow portion, high energy exhaust gases are formed, hereafter referred to as a motive flow. The pressure spike resulting from combustion causes about half of the motive flow to be discharged through the ejector nozzles 56 into the air intake 38. The high energy, high velocity motive flow directly impacts the low energy, low velocity intake flow. This impact results in compressive forces and a momentum transfer. Therefore, the flow rate of a large volume of intake flow is increased by a much smaller volume of high energy motive flow. It is understood that some or all of the ejector nozzles 56 may include boost venturis 57 which accelerate the motive flow to an even greater velocity prior to returning it to the primary air duct 32. The pressure spike of combustion causes motive flow not discharged through the ejector nozzles 56 to surge back into the resonance chamber 58 and rebound against the second closed end 62. This causes reciprocating high and low pressure acoustical waves to form. The low pressure experienced at the transfer port 66 as a result of the combustion surge induces a siphon of additional intake flow from the primary inlet passage 64 into the resonance chamber 58. Then, as the acoustical wave rebounds, it pushes and compresses the siphoned intake flow portion into the primary combustion chamber 50 and the cycle repeats. This compression effect further amplifies the energy of the intake flow portion even before combustion occurs. While the resonance chamber 58, inlet passage 64, and combustion chambers 50, 70 have been described as being mounted inside the primary air duct, it should be appreciated that these structures could be mounted outside the primary air duct 32 with appropriate channel connections.

Motive flow and the remainder of the intake flow not entering the primary inlet ports 44 of the diffuser cone 42 is compressed as it is diffused outwardly and into the secondary combustion chamber 70 (FIG. 5). The secondary combustion chamber 70 includes fuel injection means 74 and ignition means 76 for combustion of the flows. The configuration of the chamber, however, induces a torroidal vortex of the flow as shown at reference number 78 in FIG. 2. Use of a vortex during combustion heats the flow more uniformly while using less fuel than conventional steady state constant flow combustion means. The secondary combustion chamber 70 defines a pressure bleed channel 80 that taps a portion of the combustion exhaust gases back into the primary inlet passage 64 for further amplification of the intake flow portion. It should be appreciated that the vortex also serves as a dynamic variable nozzle allowing the flow to adjust to current conditions without mechanical means. It also serves to prevent secondary combustion surges by trapping energy in the form of velocity and creating an artificial low pressure to divert combustion gases from progressing forward into the diffuser section. The secondary combustion chamber 70 defines a pressure bleed channel 80 that taps a portion of the combustion exhaust gases back into the primary inlet passage 64 for further amplification of the intake flow portion. It should be appreciated that the vortex also serves as a dynamic variable nozzle allowing the flow to adjust to current conditions without mechanical means. It also serves to prevent secondary combustion surges by trapping energy in the form of velocity and creating an artificial low pressure to divert combustion gases from progressing forward into the diffuser section.

An exhaust channel 82, also referred to as an exhaust adapter, includes a first open end 84 coupled to the downstream end 36 of the gas generator 30 and a second open end 86 for discharging the motive flow amplified by the secondary combustion chamber 70 (FIG. 1). The exhaust channel 82 is integrally coupled to the blower housing 12 such that the amplified motive flow makes direct contact with the front faces of the turbine assembly blades 16 before being centrifugally discharged from the second end 86.

The flow of air through the turbo shaft engine 10 is particularly indicated in FIGS. 2 and 7 with arrows. In use, an intake air flow is collected from the atmosphere and directed into the blower housing 12 through the intake channel 22 (FIG. 7). The intake channel 22 amplifies the flow rate of the intake air flow by its decreasing diameter. Further, the incoming air flow makes a 90° turn as the blower inlet ports 14 are on the sides of the housing 12. Such a turn converts kinetic energy into impact pressure which contributes to further flow rate amplification. As the incoming air flow enters the interior chamber of the housing 12 through the blower inlet ports 14, the blades 16 of the turbine fan assembly are rotated. Thus, energy from incoming air is harvested. The intake flow collects in the blower plenum 24 where it surrounds and cools the ramjet gas generator 30, thus reducing thermal losses and inefficiencies typical with conventional turbo shaft engines.

The intake flow passes into the primary air duct 32 through its upstream air intake 38 and flows downstream toward the diffuser cone 42. A small portion of the intake air flows through primary inlet ports 44 into a primary inlet plenum 46 after its flow direction is reversed while the majority of the intake flow is diffused outwardly and enters a secondary combustion chamber 70. The 180° flow reversal converts kinetic energy into impact pressure which contributes to flow rate amplification. The portion of intake flow from the primary inlet plenum 46 passes through the primary inlet passage 64 into the resonance chamber 58 and into the primary combustion chamber 50. Upon ignition thereof, a portion of the resulting motive flow is discharged back into the primary air duct 32 where it transfers its velocity to incoming intake flow (e.g. a momentum transfer). The rest of the motive flow surges back into the resonance chamber 58 and causes resonating high/low pressure pulses. In practical effect, this acts as a gaseous piston pump by alternately siphoning intake flow into the resonance chamber 58 and then forcing it into the primary combustion chamber 50. This acoustical compression aspect provides enhanced efficiency to the amplification cycle.

The motive flow and the remainder of the intake flow are directed into the secondary combustion chamber 70 by the diffuser cone 42. The configuration of this chamber causes a vortex 78 which continues during combustion. This enables a large volume of air to be thoroughly and uniformly combusted with a minimal amount of fuel. Thus, the intake and motive flows are again amplified with minimal thermal inefficiency or limitation. A portion of this amplified flow is injected back into the primary inlet passage 64 through the bleed channel 80 so as to amplify the intake flow therein while the remainder is discharged to the blower housing 12 through the exhaust channel 82. The turbine blades 16 are rotated by this high energy flow so as to harvest the energy of the outgoing air. The air flow is centrifugally discharged into the atmosphere through the second open end 86.

Another embodiment 90 of the turbo shaft engine is constructed in a manner substantially similar to the preferred embodiment described previously, except as particularly noted below. A tubular combustion pressure tap assembly 92 extends between the primary air duct 32 and an intake opening 94 of a tubular intake channel 22 for amplifying the flow rate of incoming intake air flow through momentum transfer (FIG. 7). This allows additional energy to be harvested from incoming air with no additional heat inefficiencies.

Figure 6:
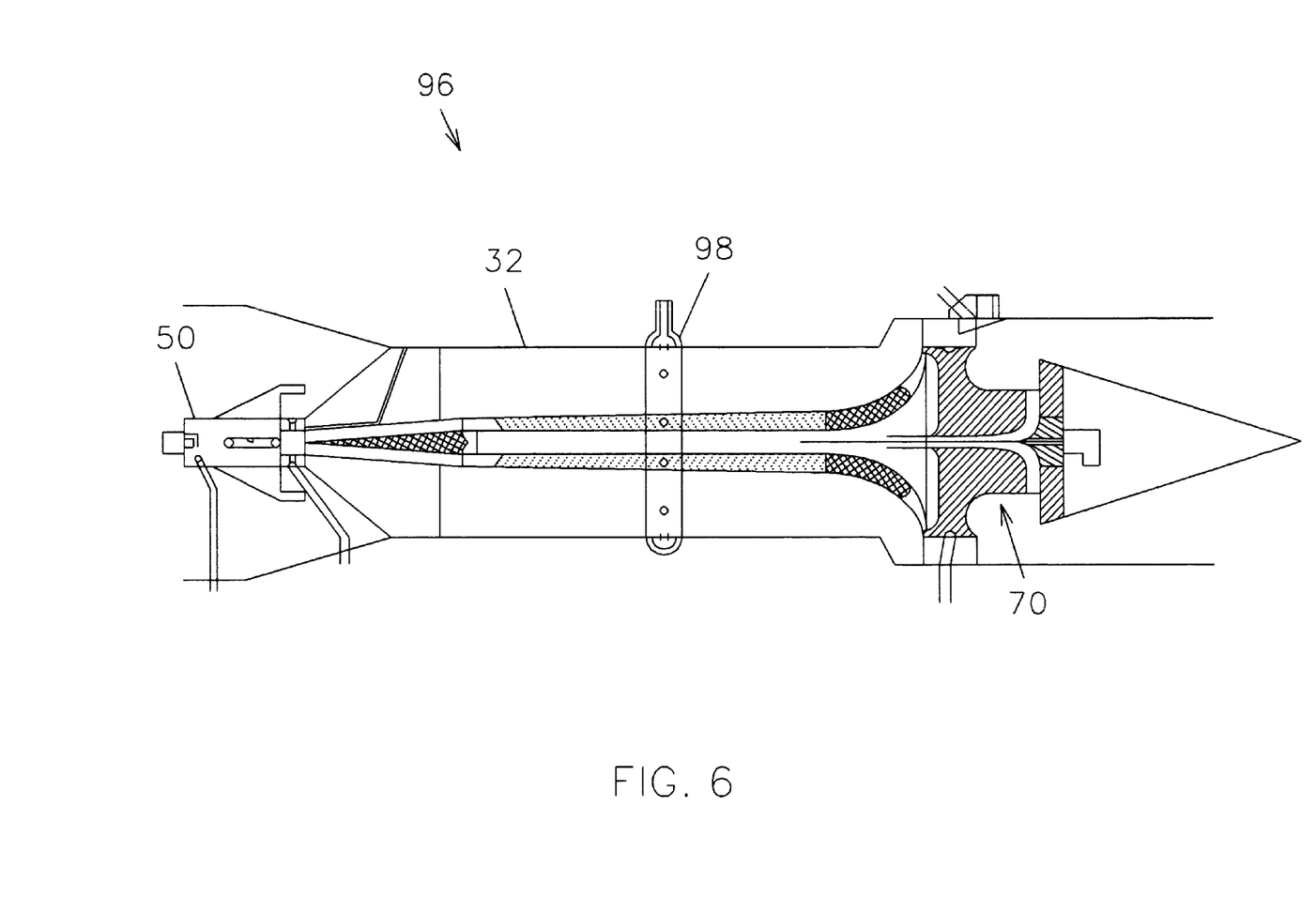
FIG. 6 is a cross-sectional view of a gas generator of a turbo shaft engine according to another embodiment of the invention.

Still another embodiment 96 is shown in FIG. 6 that is substantially similar to the preferred embodiment described above, except as noted below. A supersonic fuel manifold 98 is mounted within the primary air duct upstream from said secondary combustion chamber 70 for injecting high volatility fuel into the motive flow prior to the motive flow reaching the secondary combustion chamber. Early deposition of fuel allows it to vaporize and mix with the air so as to detonate properly when it encounters an oblique shock wave in the secondary combustion chamber.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A turbo shaft engine for amplifying the flow rate of an air stream, comprising:

a primary air duct having upstream and downstream ends, said upstream end defining an air intake for receiving an intake flow having a flow rate associated therewith and said downstream end defining an outlet port;

a primary combustion chamber connected to said primary air duct and adapted to receive a portion of said intake flow, said primary combustion chamber adapted to ignite an admixture of fuel and said intake flow portion so as to form an energized motive flow;

a primary inlet passage coupled to said primary air duct and positioned to connect said primary air duct with said primary combustion chamber, said primary inlet passage adapted to receive said intake flow portion;

means positioned between said primary air duct and said primary inlet passage for reversing the flow direction of said intake flow portion;

a plurality of ejector nozzles coupled to said primary combustion chamber for discharging said motive flow into said air intake of said primary air duct so as to amplify said flow rate of said intake flow by momentum transfer; and a turbine fan assembly coupled to said outlet port and having a hub with a plurality of blades radially mounted for rotation thereabout, said blades adapted to be rotated by said motive flow flowing through said outlet port.

2. The turbo shaft engine as in claim 1 further comprising:

a diffuser cone positioned in a downstream portion of said primary air duct having a tapered configuration adapted to direct said motive flow and said remainder of said intake flow toward said outlet port, said diffuser cone defining a plurality of primary inlet ports for communicating said intake flow portion from said primary air duct into said primary inlet passage;

wherein said reversing means includes an arcuate wall extending radially across a downstream end of said diffuser cone, said wall adapted to reverse the flow direction of air passing through said primary inlet ports from a downstream flow in said primary air duct to an upstream flow in said primary inlet passage, said reversal amplifying the flow rate of said intake flow portion.

3. The turbo shaft engine as in claim 2 further comprising:

a resonance chamber concentrically enveloping said primary inlet passage and extending longitudinally between said primary combustion chamber and said diffuser cone, said resonance chamber defining a first open end in communication with said primary combustion chamber and a second closed end adjacent said diffuser cone;

a transfer port connecting an upstream end of said primary inlet passage with said resonance chamber for communicating said intake flow therebetween;

whereby combustion within said primary combustion chamber causes a portion of said motive flow to surge back into said resonance chamber and rebound against said second closed end so as to form high and low pressure acoustical waves therein that alternately siphon said intake flow portion from said primary inlet passage into said transport port and amplify the flow rate thereof into said combustion chamber, respectively.

4. The turbo shaft engine as in claim 3 wherein said acoustical waves cause said motive flow to be pulsatingly discharged from said ejector nozzles into said primary air duct so as to alternately siphon said intake flow through said air intake into said primary air duct and amplify said flow rate thereof through direct impact therewith.

5. The turbo shaft engine as in claim 1 wherein each ejector nozzle includes a boost venturi adapted to amplify the flow rate of said motive flow passing therethrough.

6. The turbo shaft engine as in claim 1 further comprising a secondary combustion chamber positioned in said primary air duct downstream from said primary inlet passage adapted to receive said motive flow and a remainder of said intake flow not received by said primary inlet passage, said secondary combustion chamber adapted to ignite an admixture of fuel and said intake flow remainder and said motive flow to form an amplified motive flow.

7. The turbo shaft engine as in claim 6 further comprising a bleed channel connecting said secondary combustion chamber and said primary inlet passage for delivering a portion of said amplified motive flow into said primary inlet passage, whereby to amplify said flow rate of said intake flow portion.

8. The turbo shaft engine as in claim 6 wherein said secondary combustion chamber is configured to induce a torroidal vortex of said motive flow and said intake flow remainder, whereby to efficiently heat said motive flow and said intake flow remainder using a minimum amount of fuel.

9. A turbo shaft engine for amplifying the flow rate of an air stream, comprising:

a blower housing defining an interior chamber and a blower inlet port for receiving an incoming air stream into said chamber;

a turbine blower assembly rotatably mounted in said chamber and having a plurality of blades positioned for rotation by said incoming air stream, wherein each blade includes:

a front face having a flat surface adapted to directly receive said incoming air stream and said amplified air stream;

a rear face having a concave configuration adapted to induce a vortex, whereby to maximize the pressure differential across each blade;

a gas generator comprising a primary air duct defining an air intake and an opposed outlet port, said air intake connected to said blower housing for receiving said incoming air stream, said gas generator adapted to amplify the flow rate of said incoming air stream and to exhaust said amplified air stream through said outlet port; and an exhaust channel having a first open end coupled to said outlet port for receiving said amplified air stream, said exhaust channel adapted to transfer said amplified air stream through said blower housing and defining an outlet opening for exhausting said amplified air stream from said blower housing, said blades of said turbine blower assembly positioned between said inlet port and said outlet opening for rotation by said amplified air stream.

10. The turbo shaft engine as in claim 9, wherein said inlet port of said blower housing includes an arc-shaped configuration positioned such that said incoming air stream directly impacts said blades for maximum torque production.

11. The turbo shaft engine as in claim 9 further comprising an intake channel, comprising:

a first end defining an intake opening adapted to receive said incoming air stream from the atmosphere;

a second end coupled to said blower housing and defining an aperture in communication with said inlet port for delivering said incoming air stream into said chamber of said blower housing; and a combustion pressure tap assembly connecting said gas generator and said intake opening, said combustion pressure tap assembly adapted to deliver a portion of said amplified air stream into said intake opening so as to amplify the flow rate of said incoming air stream.

12. The turbo shaft engine as in claim 9 wherein said gas generator comprises:

a primary inlet passage connected to said primary air duct and adapted to receive a portion of said incoming air stream;

means between said primary air duct and said primary inlet passage for reversing the flow direction of said incoming air stream portion;

a primary combustion chamber coupled to said primary inlet passage for receiving said incoming air stream portion, said primary combustion chamber adapted to ignite an admixture of fuel and said incoming air stream portion so as to form an energized motive flow; and a plurality of ejector nozzles coupled to said primary combustion chamber for discharging said motive flow into said air intake of said primary air duct, said motive flow amplifying said flow rate of said incoming air stream.

13. A turbo shaft engine for amplifying the flow rate of an air flow, comprising:

a turbine housing defining an interior chamber and an inlet port for receiving an intake flow into said chamber, said intake flow associated with a flow rate;

a turbine blower assembly rotatably mounted in said chamber and having a plurality of blades positioned for rotation by said intake flow;

a primary air duct coupled to said turbine housing and having upstream and downstream ends, said upstream end defining an air intake for receiving said intake flow and said downstream end defining an outlet port;

a primary inlet passage connected to said primary air duct, said passage adapted to receive a portion of said intake flow from said primary air duct;

means for reversing the flow direction of said intake flow portion in said primary inlet passage;

a primary combustion chamber coupled to said primary inlet passage for receiving said intake flow portion, said primary combustion chamber adapted to ignite an admixture of fuel and said intake flow portion so as to form a high energy motive flow;

a plurality of ejector nozzles coupled to said primary combustion chamber for discharging said motive flow into said air intake of said primary air duct so as to amplify said flow rate of said intake flow; and an exhaust channel having a first open end coupled to said outlet port for receiving said motive flow and a remainder of said intake flow not received by said primary inlet passage, said exhaust channel adapted to deliver said motive flow and said intake flow remainder into said turbine housing, said blades of said turbine blower assembly positioned for rotation by said motive flow and said intake flow remainder.

14. The turbo shaft engine as in claim 13 further comprising an intake channel, comprising:

a first end defining an intake opening adapted to receive said intake flow from the atmosphere;

a second end coupled to said turbine housing and defining an aperture in communication with said inlet port for delivering said air stream into said chamber of said turbine housing; and a combustion pressure tap assembly connecting said primary air duct and said intake opening, said combustion pressure tap assembly adapted to deliver a portion of said motive flow from said primary air duct into said intake opening so as to amplify said intake flow.

15. The turbo shaft engine as in claim 13 further comprising a diffuser cone positioned in a downstream portion of said primary air duct and configured to direct said motive flow and said remainder of said intake flow toward said outlet port, said diffuser cone defining a plurality of primary inlet ports for communicating said intake flow portion from said primary air duct into said primary inlet passage;

wherein said reversing means includes an arcuate wall extending radially across a downstream end of said diffuser cone, said wall configured so as to reverse the flow direction of air passing through said primary inlet ports from a downstream flow in said primary air duct to an upstream flow in said primary inlet passage, said reversal amplifying said flow rate of said intake flow.

16. The turbo shaft engine as in claim 15 further comprising:

a resonance chamber concentrically enveloping said primary inlet passage and extending longitudinally between said primary combustion chamber and said diffuser cone, said resonance chamber defining a first open end in communication with said primary combustion chamber and a second closed end adjacent said diffuser cone;

a transfer port connecting an upstream end of said primary inlet passage with said resonance chamber for communicating said intake flow therebetween; and whereby combustion within said primary combustion chamber causes a portion of said motive flow to surge back into said resonance chamber and rebound against said second closed end so as to form high and low pressure acoustical waves therein that alternately siphon said intake flow portion from said primary inlet passage into said transport port and amplify the flow rate thereof into said combustion chamber, respectively.

17. The turbo shaft engine as in claim 16 wherein said acoustical waves cause said motive flow to be pulsatingly discharged from said ejector nozzles into said primary air duct so as to alternately siphon said intake flow through said air intake into said primary air duct and amplify said flow rate thereof by momentum transfer.

18. The turbo shaft engine as in claim 13 further comprising a secondary combustion chamber positioned in said primary air duct downstream from said primary inlet passage adapted to receive said intake flow remainder and said motive flow, said secondary combustion chamber adapted to ignite an admixture of fuel and said remainder of said intake flow and said motive flow to form an amplified motive flow.

19. The turbo shaft engine as in claim 18 further comprising an inlet fuel manifold positioned in said primary air duct upstream from said secondary combustion chamber and adapted to inject high volatility fuel into said motive flow and said intake flow such that said fuel is vaporized therein prior to reaching said secondary combustion chamber, whereby to induce supersonic combustion upon ignition thereof in said secondary combustion chamber.

20. The turbo shaft engine as in claim 13 wherein said exhaust channel defines an outlet opening through which said amplified intake flow and said motive flow are centrifugally exhausted from said turbine housing by said blades.

21. A ram jet for amplifying the flow rate of an air stream, comprising:

a primary air duct having upstream and downstream ends, said upstream end defining an air intake for receiving an intake flow having a flow rate associated therewith and said downstream end defining an outlet port;

a primary combustion chamber connected to said primary air duct and adapted to receive a portion of said intake flow, said primary combustion chamber adapted to ignite an admixture of fuel and said intake flow portion so as to form an energized motive flow;

a primary inlet passage coupled to said primary air duct and positioned to connect said primary air duct with said primary combustion chamber, said primary inlet passage adapted to receive said intake flow portion;

means positioned between said primary air duct and said primary inlet passage for reversing the flow direction of said intake flow portion; and a plurality of ejector nozzles coupled to said primary combustion chamber for discharging said motive flow into said air intake of said primary air duct so as to amplify said flow rate of said intake flow by momentum transfer.

* * * * *